(12) United States Patent
Kato

(10) Patent No.: US 7,864,363 B2
(45) Date of Patent: Jan. 4, 2011

(54) IMAGE PROCESSING METHOD AND IMAGE OUTPUT SYSTEM

(75) Inventor: Minako Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 10/656,103

(22) Filed: Sep. 8, 2003

(65) Prior Publication Data

US 2004/0085555 A1 May 6, 2004

(30) Foreign Application Priority Data

Sep. 9, 2002 (JP) ............................. 2002-263263

(51) Int. Cl.
  H04N 1/034 (2006.01)
  H04N 1/54 (2006.01)
  H04N 1/56 (2006.01)
  H04N 1/60 (2006.01)
  G03F 3/00 (2006.01)
  B41J 2/01 (2006.01)
  B41J 2/36 (2006.01)

(52) U.S. Cl. .................. 358/1.9; 358/3.09; 358/3.1; 358/3.11; 358/3.12; 358/518; 358/519; 347/15; 347/131; 347/254

(58) Field of Classification Search ............... 358/3.09, 358/3.1, 3.11, 3.12, 1.9, 518, 519; 347/15, 347/131, 254

See application file for complete search history.

(56) References Cited

U.S. PATENT DOCUMENTS

| 4,713,701 | A | * | 12/1987 | Kawamura et al. ............ 358/3.1 |
| 5,457,007 | A | * | 10/1995 | Asami ........................ 430/363 |
| 5,982,990 | A | * | 11/1999 | Gondek ....................... 358/1.9 |
| 5,982,993 | A | * | 11/1999 | Slade .......................... 358/1.9 |
| 5,988,791 | A | * | 11/1999 | Miyashita et al. ............. 347/43 |
| 6,027,196 | A | * | 2/2000 | Gotoh et al. ................... 347/7 |
| 6,053,595 | A | * | 4/2000 | Otsuka et al. ................. 347/9 |
| 6,132,022 | A | * | 10/2000 | Akiyama et al. .............. 347/15 |
| 6,178,008 | B1 | * | 1/2001 | Bockman et al. ............. 358/1.9 |
| 6,256,110 | B1 | * | 7/2001 | Yoshitani ..................... 358/1.9 |
| 6,299,285 | B1 | * | 10/2001 | Inui ............................ 347/43 |
| 6,406,113 | B1 | | 6/2002 | Kato ........................... 347/14 |
| 6,435,657 | B1 | * | 8/2002 | Couwenhoven et al. ....... 347/43 |
| 6,467,891 | B2 | | 10/2002 | Moriyama et al. ............ 347/96 |
| 6,509,916 | B1 | * | 1/2003 | Kakinuma et al. ............ 347/43 |
| 6,540,327 | B1 | * | 4/2003 | Akiyama et al. .............. 347/43 |
| 6,592,212 | B1 | * | 7/2003 | Kakutani ..................... 347/86 |
| 6,633,407 | B1 | * | 10/2003 | Kim et al. .................... 358/1.9 |
| 6,717,601 | B2 | * | 4/2004 | Sanger ........................ 347/115 |
| 6,786,578 | B1 | * | 9/2004 | Aschman et al. ............. 347/85 |
| 6,930,809 | B1 | * | 8/2005 | Kagawa et al. .............. 358/518 |

(Continued)

FOREIGN PATENT DOCUMENTS

CA 2124036 11/1994

(Continued)

Primary Examiner—Edward L Coles
Assistant Examiner—Beniyam Menberu
(74) Attorney, Agent, or Firm—Fitzpatrick, Cella, Harper & Scinto

(57) ABSTRACT

An image processing apparatus includes a first unit for converting primary color data into color data for outputting a dark color material only in a first mode, and a second unit for converting the primary color data into color data for outputting both the dark color material and a light color material in a second mode.

20 Claims, 12 Drawing Sheets

U.S. PATENT DOCUMENTS

| | | | |
|---|---|---|---|
| 6,962,404 B2 * | 11/2005 | Nunokawa et al. | 347/43 |
| 7,222,928 B2 * | 5/2007 | Fujimori | 347/15 |
| 7,240,988 B2 * | 7/2007 | Gardner et al. | 347/43 |
| 7,528,971 B2 * | 5/2009 | Harrington | 358/1.13 |
| 2002/0018088 A1 | 2/2002 | Takahashi et al. | 347/15 |
| 2002/0048031 A1 * | 4/2002 | Suwa et al. | 358/1.9 |
| 2002/0054306 A1 * | 5/2002 | Iida et al. | 358/1.9 |
| 2003/0007024 A1 * | 1/2003 | Fujimori | 347/15 |
| 2003/0052942 A1 * | 3/2003 | Yashima et al. | 347/43 |
| 2003/0179410 A1 * | 9/2003 | Velde | 358/3.03 |

FOREIGN PATENT DOCUMENTS

| | | |
|---|---|---|
| EP | 0 627 323 | 12/1994 |
| EP | 0 628 415 | 12/1994 |
| JP | 64-012381 | 1/1989 |
| JP | 6-255132 | 9/1994 |
| JP | 06-328733 | 11/1994 |
| JP | 07-001748 | 1/1995 |
| JP | 10-226057 | 8/1998 |
| JP | 2000-006442 | 1/2000 |
| JP | 2000-209435 | 7/2000 |
| JP | 2001-138552 | 5/2001 |

\* cited by examiner

IMAGE PROCESSING METHOD AND IMAGE OUTPUT SYSTEM

This application claims priority from Japanese Patent Application No. 2002-263263 filed Sep. 9, 2002, which is incorporated hereinto by reference.

BACKGROUND OF THE INVENTION

1. Field of the Invention

The present invention relates to an image processing method and an image output system. More specifically, the present invention relates to an image processing method, an image processing apparatus, an image processing method for an image output system, and an image output system all of which accomplish high quality prints by preventing the degradation of the image quality on the basis of the combination of densities and sizes of dots used to form images.

2. Description of the Related Art

Many color ink jet printers as color output apparatuses express images using three colors including cyan (C), magenta (M), and yellow (Y) or four colors including these three colors and black (K). In recent years, in order to further improve image quality, large-and-small-dot ink systems and dark-and-light-color-dot ink systems have been proposed; the large-and-small-dot ink system uses different per-droplet amounts for ink of the same color, and the dark-and-light-color-dot ink system has a plurality of inks of similar shades but different densities.

Color materials such as dyes and pigments which are selected for the inks of saturated cyan, magenta, and yellow, primary colors essential to printing, are selected on the basis of ejection characteristics, safety, and the easiness with which they are manufactured. These inks do not always have the ideal hues of the saturated colors. However, it may be desirable that as colors reproduced on a print sheet be faithful to, for example, colors displayed on a monitor.

FIG. 1 is a plot in which CIELab coordinate axes indicate data obtained by executing a calorimetric process on a patch printed with a C, M, and Y inks and values for the colors C, M, and Y on a monitor which values are calculated using an sRGB equation. The figure indicates that compared to the colors reproduced on the monitor, the ink reproduced colors shown in FIG. 1 are such that the cyan ink has a hue closer to magenta, the magenta ink has a hue closer to yellow, and the yellow ink has a hue closer to magenta. To faithfully reproduce the colors Y, M, and C displayed on the monitor, a small amount of C ink may be added to the Y or M ink when the latter is outputted. On the other hand, a small amount of Y ink may be added to the C ink when the latter is outputted. That is, color mixture may be carried out. It is thus easier to make colors reproduced by the printer closer to those reproduced on the monitor by using the ink colors C, M, and Y, which are essential to color printing, to carry out a color conversion such that printed colors in input signal which represent C, M, and Y respectively are closer to the colors C, M, and Y displayed on the monitor.

The above conventional technique is suitable for images such as photographs which contain many nonuniform and complicated colors. However, in the case of images such as graphs which preferably contain uniform colors, in an area of the image which otherwise contains a single color, dots of other colors may appear. These dots may appear granular and disagreeable to users.

SUMMARY OF THE INVENTION

The present invention is provided in view of these problems. It is an object of the present invention to provide an image processing method and an image output system both providing print images that have a sufficient image quality to meet the purpose and that do not appear granular to users.

To achieve this object, according to the present invention, there is provided an image processing method of converting image data composed of an R, G, and B colors into one or more pixel data corresponding to color materials for a plurality of ejection units which eject the respective color materials and two of which eject color materials of the same color or similar shades, the method being characterized by comprising a mode selecting step of selecting either a first mode using only an ejection unit that ejects large amounts of a color material for color materials of the same color or similar shades and a second mode using all ejection units or not using the ejection unit that ejects large amounts of a color material, a first converting step of operating if the first mode is selected, to convert the image data in which two of the colors R, G, and B have their maximum values and which represents a primary color into the one pixel data corresponding to the primary color, and a second converting step of operating if the second mode is selected, to convert the image data which represents the primary color into the plurality of pixel data constituting hues equal to the primary color.

Further, according to the present invention, there is provided an image processing apparatus that converts image data composed of an R, G, and B colors into one or more pixel data corresponding to color materials for a plurality of ejection units which eject the respective color materials and two of which eject color materials of the same color or similar shades, the apparatus being characterized by comprising a mode selecting unit for selecting either a first mode using only an ejection unit that ejects large amounts of a color material for color materials of the same color or similar shades and a second mode using all ejection units or not using the ejection unit that ejects large amounts of a color material, a first converting unit for operating if the first mode is selected, to convert the image data in which two of the colors R, G, and B have their maximum values and which represents a primary color into the one pixel data corresponding to the primary color, and a second converting unit for operating if the second mode is selected, to convert the image data which represents the primary color into the plurality of pixel data constituting hues equal to the primary colors.

Furthermore, according to the present invention, there is provided an image processing method for an image output system including an image output apparatus having a plurality of ejection units which eject respective color materials and two of which eject color materials of the same color or similar shades and an image processing apparatus which converts image data composed of an R, G, and B colors into one or more pixel data corresponding to the color materials for the plurality of ejection units, the method being characterized by comprising a mode selecting step of causing the image processing apparatus to select either a first mode using only an ejection unit that ejects large amounts of a color material for color materials of the same color or similar shades and a second mode using all ejection units or not using the ejection unit that ejects large amounts of a color material, a first converting step of causing the image processing apparatus to operate if the first mode is selected, to convert the image data in which two of the colors R, G, and B have their maximum values and which represents a primary color into the one pixel data corresponding to the primary color, a second converting step of causing the image processing apparatus to operate if the second mode is selected, to convert the image data which represents the primary color into the plurality of pixel data constituting hues equal to the primary color, and a data generating step of causing the image processing apparatus to generate output data from a plurality of pixel data obtained in the first converting step or the second converting step, the output data being outputted by the image output apparatus.

Moreover, according to the present invention, there is provided an image output system including an image output apparatus having a plurality of ejection units which eject respective color materials and two of which eject color materials of the same color or similar shades and an image processing apparatus which converts image data composed of an R, G, and B colors into one or more pixel data corresponding to the color materials for the plurality of ejection units, the system being characterized in that the image processing apparatus comprises a mode selecting unit for selecting either a first mode using only an ejection unit that ejects large amounts of a color material for color materials of the same color or similar shades and a second mode using all ejection units or not using the ejection unit that ejects large amounts of a color material, a first converting unit for operating if the first mode is selected, to convert the image data in which two of the R, G, and B colors have their maximum values and which represents a primary colors into the one pixel data corresponding to the primary colors, a second converting unit for operating if the second mode is selected, to convert the image data which represents the primary color into the plurality of pixel data constituting hues equal to the primary colors, and a data generating unit for generating output data from a plurality of pixel data obtained by the first converting unit or the second converting unit, the output data being outputted by the image output apparatus.

Further, according to the present invention, there is provided a computer program product for causing a computer to execute an image processing method of converting image data composed of the R, G, and B colors into one or more pixel data corresponding to color materials for a plurality of ejection units which eject the respective color materials and two of which eject color materials of the same color or similar shades, the computer program product being characterized by comprising a first program code means for selecting either a first mode using only an ejection unit that ejects large amounts of a color material for color materials of the same color or similar shades and a second mode using all ejection units or not using the ejection unit that ejects large amounts of a color material, a second program code means for operating if the first mode is selected, to convert the image data in which two of the R, G, and B colors have their maximum values and which represents a primary color into the one pixel data corresponding to the primary color, and a third program code means for operating if the second mode is selected, to convert the image data which represents the primary color into the plurality of pixel data constituting hues equal to the primary color.

Furthermore, according to the present invention, there is provided a computer-readable recording medium having a program recorded on it for causing a computer to execute an image processing method of converting image data composed of an R, G, and B colors into one or more pixel data corresponding to color materials for a plurality of ejection units which eject the respective color materials and two of which eject color materials of the same color or similar shades, the recording medium being characterized in that the program comprises a first program code means for selecting either a first mode using only an ejection unit that ejects large amounts of a color material for color materials of the same color or similar shades and a second mode using all ejection units or not using the ejection unit that ejects large amounts of a color material, a second program code means for operating if the first mode is selected, to convert the image data in which two of the R, G, and B colors have their maximum values and which represents a primary color into the one pixel data corresponding to the primary color, and a third program code means for operating if the second mode is selected, to convert the image data which represents the primary color into the plurality of pixel data constituting hues equal to the primary color.

Further, according to the present invention, there is provided an image processing method of converting image data composed of an R, G, and B colors into one or more pixel data corresponding to color materials for a plurality of ejection units which eject the respective color materials and two of which eject color materials of the same color or similar shades, the method being characterized by comprising a mode selecting step of selecting either a first mode using only an ejection unit that has high-density of a color material for color materials of the same color or similar shades and a second mode using all ejection units, a first converting step of operating if the first mode is selected, to convert the image data in which two of the colors R, G, and B have their maximum values and which represents a primary color into the one pixel data corresponding to the primary color and a second converting step of operating if the second mode is selected, to convert the image data which represents the primary color into the plurality of pixel data constituting hues equal to the primary color.

Further, according to the present invention, there is provided an image processing apparatus that converts image data composed of an R, G, and B colors into one or more pixel data corresponding to color materials for a plurality of ejection units which eject the respective color materials and two of which eject color materials of the same color or similar shades, the apparatus being characterized by comprising a mode selecting unit for selecting either a first mode using only an ejection unit that has high-density of a color material for color materials of the same color or similar shades and a second mode using all ejection units, a first converting unit for operating if the first mode is selected, to convert the image data in which two of the colors R, G, and B have their maximum values and which represents a primary color into the one pixel data corresponding to the primary color, and a second converting unit for operating if the second mode is selected, to convert the image data which represents the primary color into the plurality of pixel data constituting hues equal to the primary colors.

Furthermore, according to the present invention, there is provided an image processing method for an image output system including an image output apparatus having a plurality of ejection units which eject respective color materials and two of which eject color materials of the same color or similar shades and an image processing apparatus which converts image data composed of an R, G, and B colors into one or more pixel data corresponding to the color materials for the plurality of ejection units, the method being characterized by comprising a mode selecting step of causing the image processing apparatus to select either a first mode using only an ejection unit that has high-density of a color material for color materials of the same color or similar shades and a second mode using all ejection units, a first converting step of causing the image processing apparatus to operate if the first mode is selected, to convert the image data in which two of the colors R, G, and B have their maximum values and which represents a primary color into the one pixel data corresponding to the primary color, a second converting step of causing the image processing apparatus to operate if the second mode is selected, to convert the image data which represents the primary color into the plurality of pixel data constituting hues equal to the primary color, and a data generating step of causing the image processing apparatus to generate output data from a plurality of pixel data obtained in the first converting step or the second converting step, the output data being outputted by the image output apparatus.

Moreover, according to the present invention, there is provided an image output system including an image output apparatus having a plurality of ejection units which eject respective color materials and two of which eject color materials of the same color or similar shades and an image processing apparatus which converts image data composed of an R, G, and B colors into one or more pixel data corresponding to the color materials for the plurality of ejection units, the system being characterized in that the image processing apparatus comprises a mode selecting unit for selecting either a first mode using only an ejection unit that has high-density of a color material for color materials of the same color or similar shades and a second mode using all ejection units, a first converting unit for operating if the first mode is selected, to convert the image data in which two of the R, G, and B colors have their maximum values and which represents a primary colors into the one pixel data corresponding to the primary colors, a second converting unit for operating if the second mode is selected, to convert the image data which represents the primary color into the plurality of pixel data constituting hues equal to the primary colors, and a data generating unit for generating output data from a plurality of pixel data obtained by the first converting unit or the second converting unit, the output data being outputted by the image output apparatus.

Further, according to the present invention, there is provided a computer program product for causing a computer to execute an image processing method of converting image data composed of the R, G, and B colors into one or more pixel data corresponding to color materials for a plurality of ejection units which eject the respective color materials and two of which eject color materials of the same color or similar shades, the computer program product being characterized by comprising a first program code means for selecting either a first mode using only an ejection unit that has high-density of a color material for color materials of the same color or similar shades and a second mode using all ejection units, a second program code means for operating if the first mode is selected, to convert the image data in which two of the R, G, and B colors have their maximum values and which represents a primary color into the one pixel data corresponding to the primary color, and a third program code means for operating if the second mode is selected, to convert the image data which represents the primary color into the plurality of pixel data constituting hues equal to the primary color.

Furthermore, according to the present invention, there is provided a computer-readable recording medium having a program recorded on it for causing a computer to execute an image processing method of converting image data composed of an R, G, and B colors into one or more pixel data corresponding to color materials for a plurality of ejection units which eject the respective color materials and two of which eject color materials of the same color or similar shades, the recording medium being characterized in that the program comprises a first program code means for selecting either a first mode using only an ejection unit that has high-density of a color material for color materials of the same color or similar shades and a second mode using all ejection units, a second program code means for operating if the first mode is selected, to convert the image data in which two of the R, G, and B colors have their maximum values and which represents a primary color into the one pixel data corresponding to the primary color, and a third program code means for operating if the second mode is selected, to convert the image data which represents the primary color into the plurality of pixel data constituting hues equal to the primary color.

With the above configuration, color conversion that is free from granularity and that accurately expresses the hues of output colors or color conversion giving a higher priority to the absence of granularity than color reproduction is selected in accordance with the purpose of the print, the composition of ink used, or the configuration of a print head. Thus, preferable high-quality color outputs can be provided.

As described above, according to the present invention, with a color output apparatus that can form dots with reduced granularity such as small dots and light color dots, depending on whether or not a print mode indicates printing with a large-and-small-dot ink system, a dark-and-light-color-dot ink system, or the like, it is determined whether or not, for printed colors in an input signal that are primary colors (C, M, and Y), hues are adjusted by mixing two ink colors for large and small dots or for dark and light color dots, i.e. whether or not data corresponding to two inks for large and small dots or for dark and light color dots is made significant. As a result, for images such as graphs which are desirably uniform, printed images free from granularity are obtained promptly even if hues cannot be adjusted. Further, for images such as photographs for which colors are desirably accurately reproduced, high-quality print results free from granularity and matching monitor displayed colors are obtained by selecting a mode in which hues are adjusted using small, light-color, and other dots which have reduced granularity, to adjust the hues of the primary colors without degrading print image quality.

Thus, regardless of the print mode, favorable images are obtained without degrading image quality owing to granularity.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described with reference to the drawings.

For description, inks of C, M, and Y, the fundamental primary colors, will be referred to as "C ink" or "cyan ink"; "M ink" or "magenta ink"; and "Y ink" or "yellow ink", respectively. Further, in input data composed of 8 bits (256 gradations from 0 to 255) for each of R, G, and B, data representing the primary color C, in which G=B=255, is called "C input data" or "cyan input data". Similarly, data representing the primary color M, in which R=B=255, is called "M input data" or "magenta input data". Similarly, data representing the primary color Y, in which R=G=255, is called "Y input data" or "yellow input data".

Embodiment 1

In Embodiment 1, description will be given of a system that can eject large and small ink dots of the same color.

Figure 1:
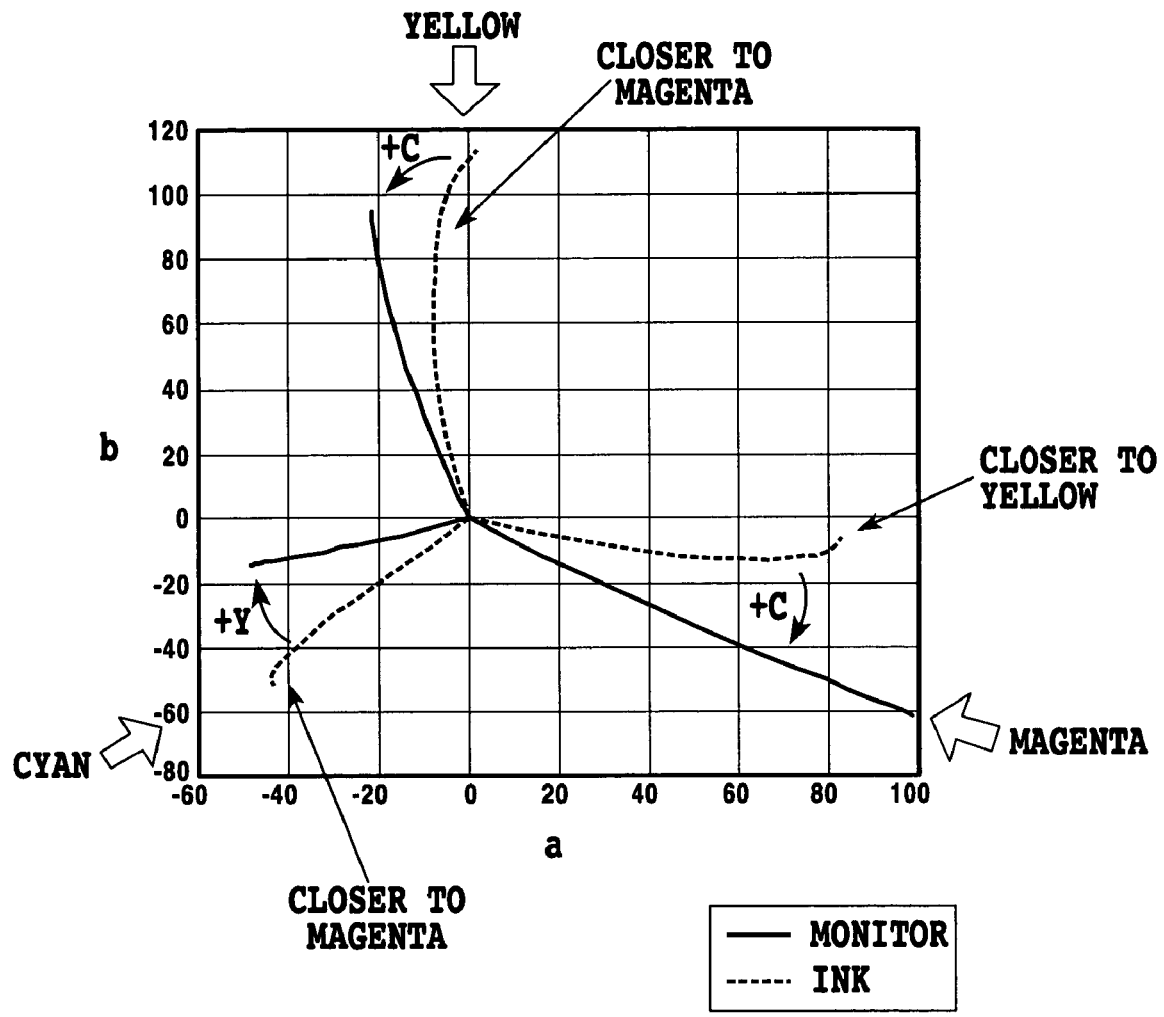
FIG. 1 is a graph illustrating conventional differences between colors reproduced with ink and colors reproduced on a monitor.
Figure 2:
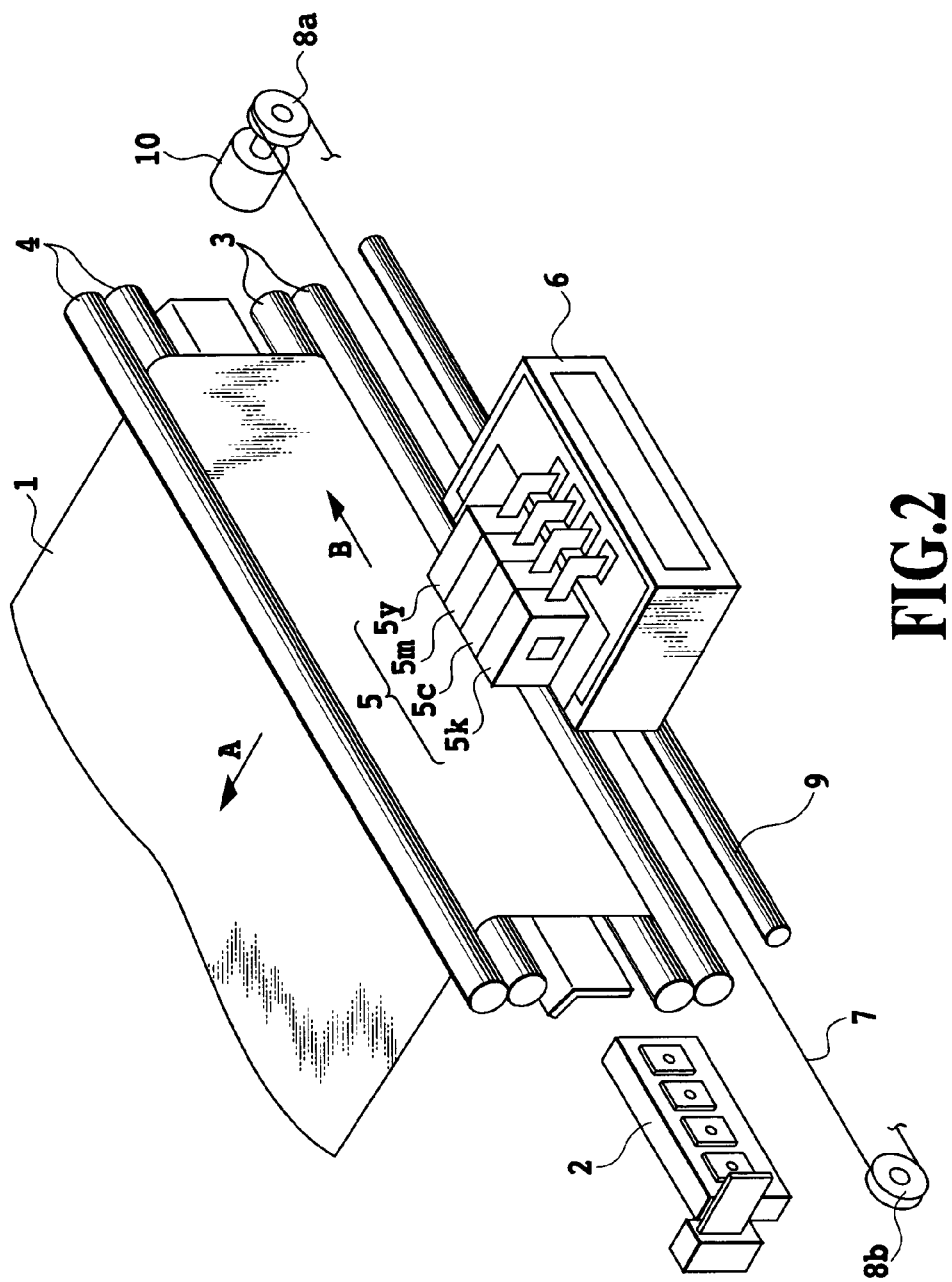
FIG. 2 is a schematic view of an ink jet printing apparatus that is applicable to Embodiments 1 and 2 of the present invention.

FIG. 2 shows an example of an ink jet printer to which the present invention is applicable. Reference numeral 1 denotes a print sheet composed of paper or a plastic sheet. A plurality of print sheets 1 are stacked in a cassette and the like, and fed one by one by a sheet feeding roller (not shown). The print sheet 1 is conveyed in the direction of an arrow A by a first conveying roller 3 and a second conveying roller 4 arranged with a specified spacing between them and driven by respective stepping motors (not shown).

Reference numeral 5 denotes an ink jet type print head used to print the print sheet 1. The print head is composed of ink ejecting heads and ink tanks. Inks from a K ink tank 5k, a C ink tank 5c, an M ink tank 5m, and a Y ink tank 5y are supplied to the ink ejecting heads (not shown) arranged opposite the paper. The inks are then ejected from nozzles in accordance with image signals. The print head 5 is mounted on a carriage 6. A carriage motor 10 is connected to the carriage 6 via a belt 7 and pulleys 8a and 8b. Accordingly, the carriage 6 is driven by the carriage motor 10 to scan along a guide shaft 9 in a reciprocatory manner.

With this configuration, the print head 5 prints an ink image by ejecting ink onto the print sheet 1 in response to an image signal while moving in the direction of an arrow B. The print head 5 returns to its home position as required, to recover the clogged-up nozzles using an ink recovery device 2. The conveying rollers 3 and 4 are driven to convey the print sheet 1 in the direction of the arrow A by an amount equal to one row. These operations are repeated to execute predetermined printing on the print sheet 1.

Figure 3:
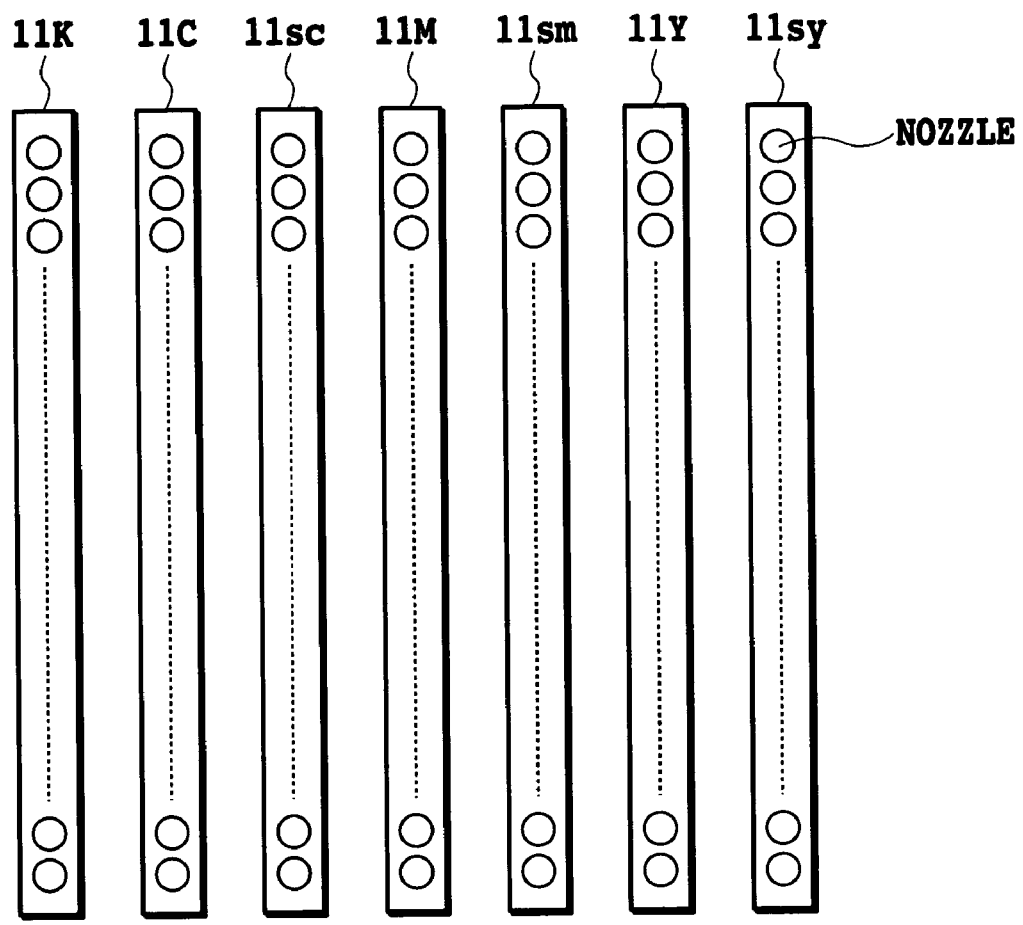
FIG. 3 is a view of an ink jet print head that is applicable to Embodiments 1 and 2 of the present invention.

FIG. 3 is a schematic view of an ink jet print head in an ink jet printer to which the present invention is applicable. This figure show a surface located opposite the paper. The following heads are arranged as shown in the figure: a black (K) ink ejecting head 11K, a large drop cyan (C) ejecting head 11C, a small drop cyan (sc) ejecting head 11sc, a large drop magenta (M) ejecting head 11M, a small drop magenta (sm) ejecting head 11sm, a large drop yellow (Y) ejecting head 11Y, small drop yellow (sy) ejecting head 11sy. The K ejecting head 11K is connected to the K ink tank 5k. The C ejecting heads 11C and 11sc are connected to the C ink tank 5c. The M ejecting heads 11M and 11sm are connected to the M ink tank 5m. The Y ejecting heads 11Y and 11sy are connected to the Y ink tank 5y. Each ejecting head has 128 nozzles arranged at a pitch of 600 dpi. The ejecting heads are separately driven in accordance with data to form images. The ink ejecting heads 11K, 11C, 11M, and 11Y generate large dots each having an ejection amount of about 15 ng. The ink ejecting heads 11sc, 11sm and 11sy generate small dots each having an ejection amount of about 7 ng.

Figure 4:
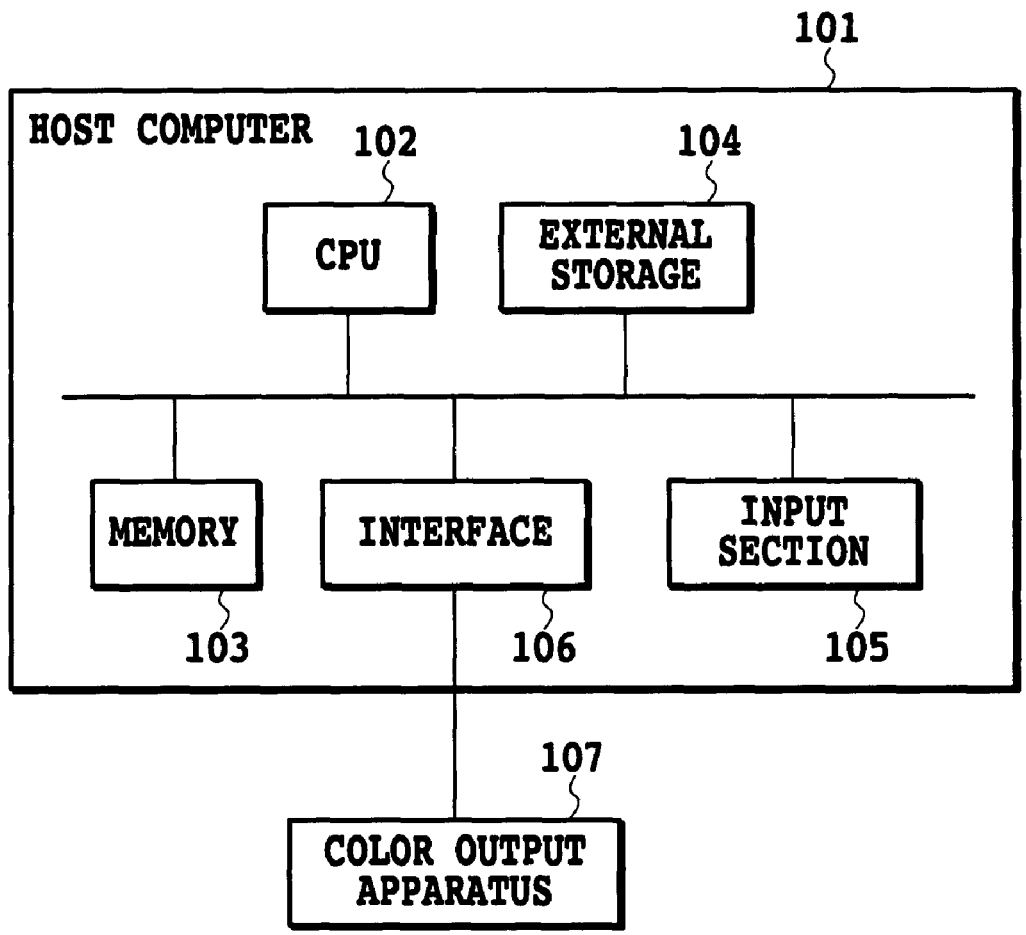
FIG. 4 is a block diagram of an image output system that is applicable to Embodiments 1 to 3 of the present invention.

FIG. 4 is an image processing system to which the present invention is applied. In FIG. 4, a host computer 101 comprises a CPU 102, a memory 103, an external storage 104, an input section 105, and an interface 106 to a printer. The CPU 102 executes a program stored in the memory 103 to implement procedures such as a color process and a quantization process, described later with reference to FIG. 4. This program may be stored in the external storage 104 or may be supplied by an external device. The host computer 101 is connected to a color output apparatus 107 (an ink jet printed such as the one described above with reference to FIGS. 2 and 3) via the interface. The host computer 101 transmits image data subjected to a color process to the color output apparatus 107 for printing.

Figure 5:
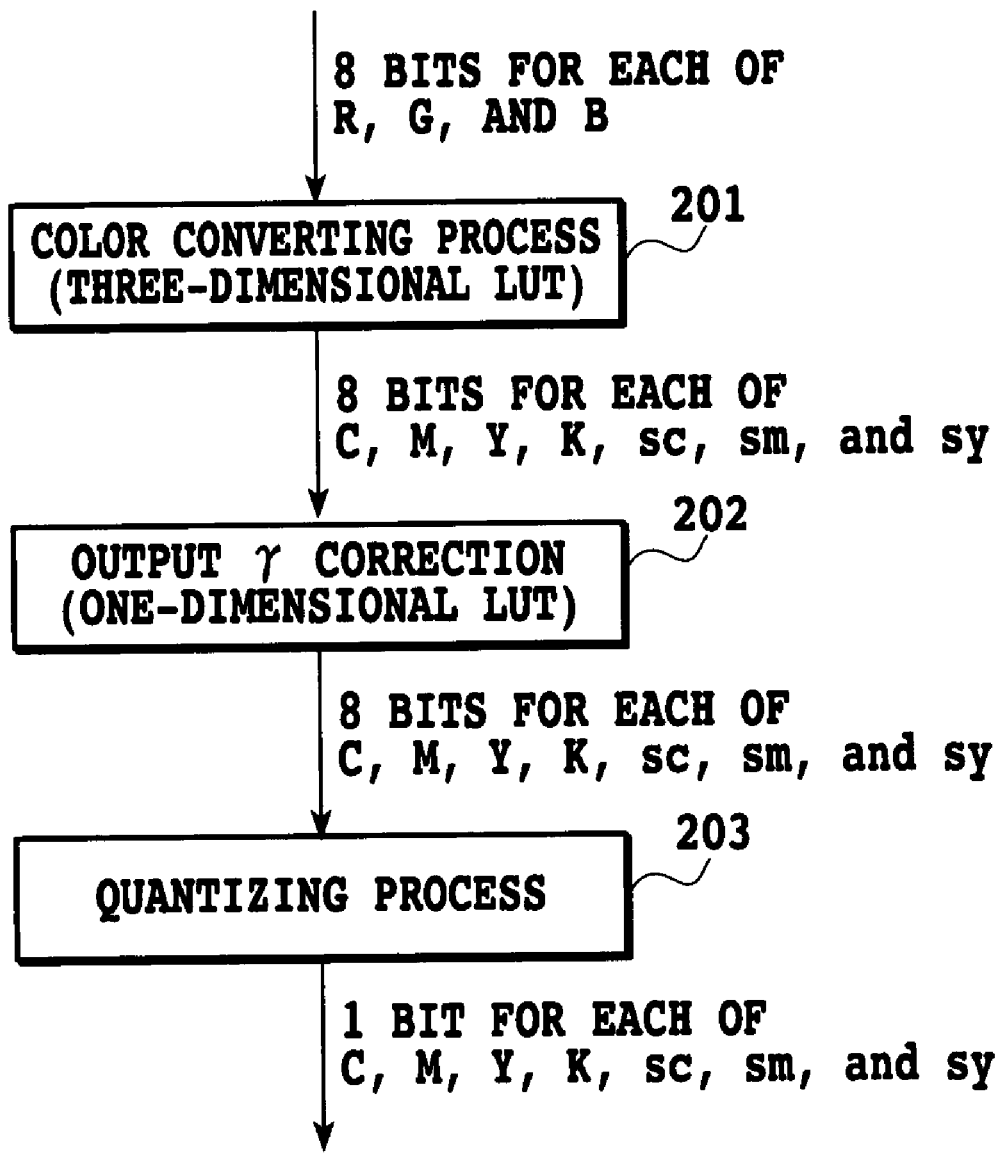
FIG. 5 is a flow chart of an image process that is applicable to Embodiments 1 to 3 of the present invention.

FIG. 5 is a flow chart illustrating an image process in the above described image processing system. This figure shows a process flow in which image data composed of 8 bits (256 gradations from 0 to 255) for each of the R, G, and B and corresponding to one pixel inputted to the host computer 101 is outputted as one-bit output data for each of the colors C, M, Y, K, sc, sm, and sy. The process procedure in FIG. 5 indicates the contents of a process executed by a program executed by the CPU 102. The CPU 102 reads this program from the memory 103 to execute it.

First, during a color converting process (step 201), the 8-bit data for the R, G, and B are associated with one another using a three-dimensional lookup table (LUT). The data are then converted into 8-bit output data for the colors C, M, Y, K, sc, sm, and sy, which correspond to the output colors of the printer. For description, the 8-bit output data for the respective colors will be referred to as "C output data", "M output data", "Y output data", "sc output data", "sm output data", and "sy output data". This process converts inputted RGB colors into outputted CMY colors. Input data are often composed of three primary colors (RGB) for a luminous element such as a display which colors are based on additive mixture. However, the printer according to the present embodiment uses a C, M, and Y color materials, so that a corresponding converting process is executed.

Figure 6:
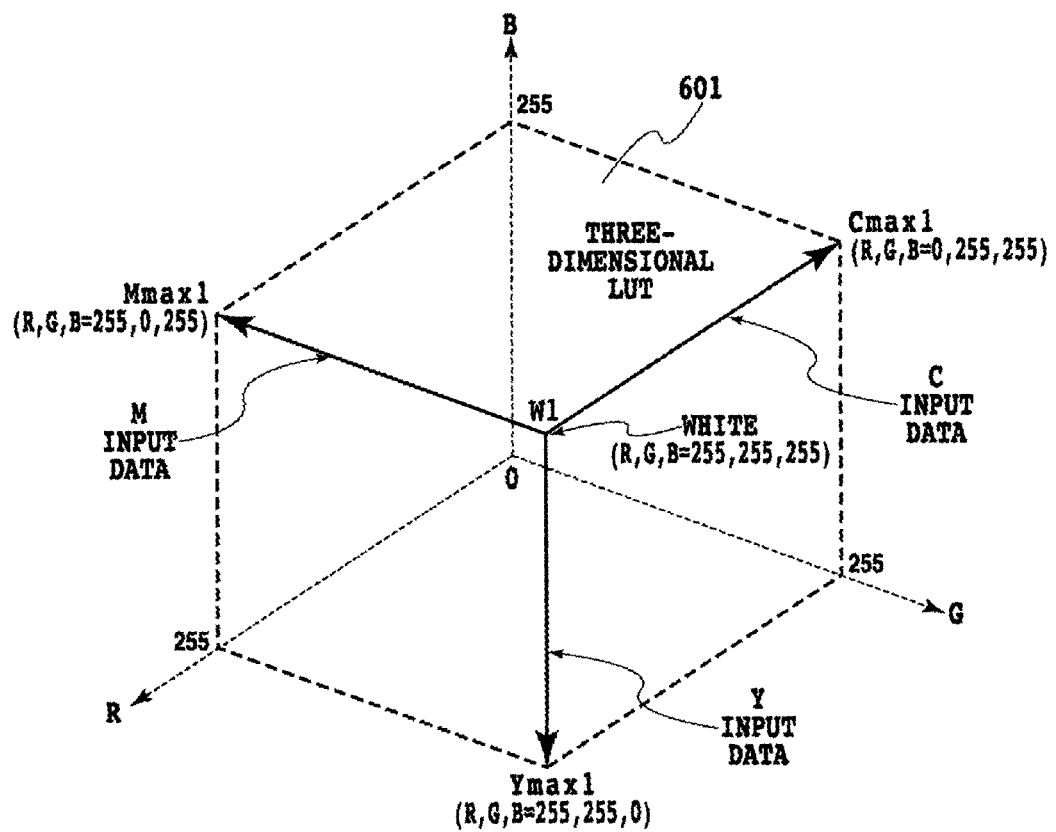
FIG. 6 is a view showing the concept of a three-dimensional LUT according to the embodiments of the present invention.

FIG. 6 shows the concept of the three-dimensional LUT according to the present embodiment. This three-dimensional LUT 601 is used to convert RGB input data corresponding to points in an arbitrary RGB coordinates into corresponding 8-bit output data for the colors C, M, Y, K, sc, sm, and sy. As shown in FIG. 6, the three-dimensional LUT 601 has vertexes W1, Cmax1, Mmax1, and Ymax1 in an RGB three-dimensional space.

In this case, for a point W1 with RGB coordinates (255, 255, 255), C, M, and Y input data corresponding to white are converted into the corresponding 8-bit output data for the colors C, M, Y, K, sc, sm, and sy. Likewise, for a point Cmax1 with RGB coordinates (0, 255, 255), C input data corresponding to the densest cyan is converted. For a point Mmax1 with RGB coordinates (255, 0, 255), M input data corresponding to the densest magenta is converted. For a point Ymax1 with RGB coordinates (255, 255, 0), Y input data corresponding to the densest yellow is converted.

In FIG. 6, the more the coordinate for the R component decreases down to 0 from the point W1 to the point Cmax1, the more C input data corresponding to dense cyan is converted. The more the coordinate for the G component decreases down to 0 from the point W1 to the point Mmax1, the more M input data corresponding to dense magenta is converted. The more the coordinate for the B component decreases down to 0 from the point W1 to the point Ymax1, the more Y input data corresponding to dense yellow is converted.

In the present embodiment provides a plurality of three-dimensional LUTs for a color converting process (step 201) based on the three-dimensional LUT 601 shown in FIG. 6. Thus, color conversion is carried out using the three-dimensional LUT in accordance with a print mode as described below. Each process using the three-dimensional LUT is described below in detail.

The three-dimensional LUT used for a color process (conversion) discretely holds data. Accordingly, an interpolation process is used for the held data. However, this interpolation process is a well-known technique, and its detailed description is omitted.

During an output γ correcting process (step 202), 8-bit output data for the colors C, M, Y, K, ac, sm, and sy subjected to a color process are subjected to output γ correction by a one-dimensional LUT. In most cases, the relationship between the number of print dots per unit area and output characteristics (the reflection density of an image printed on a print sheet) is not linear. Accordingly, the output γ correction is used to ensure the linear relationship between the input level of 8 bits for each color and the corresponding output characteristics.

The color process operations have been described. Input data composed of 8 bits for each of the colors R, G, and B are converted into 8-bit output data for the colors of the color materials C, M, Y, K, sc, sm, and sy possessed by the output equipment.

The color output apparatus according to the present embodiment is a binary printing apparatus. Accordingly, during the subsequent quantizing process (step 203), data composed of 8 bits for each of the colors are quantized into binary data composed of 1 bit for each color. A well-known error diffusion method or dither method is used as a quantizing method.

Figure 7:
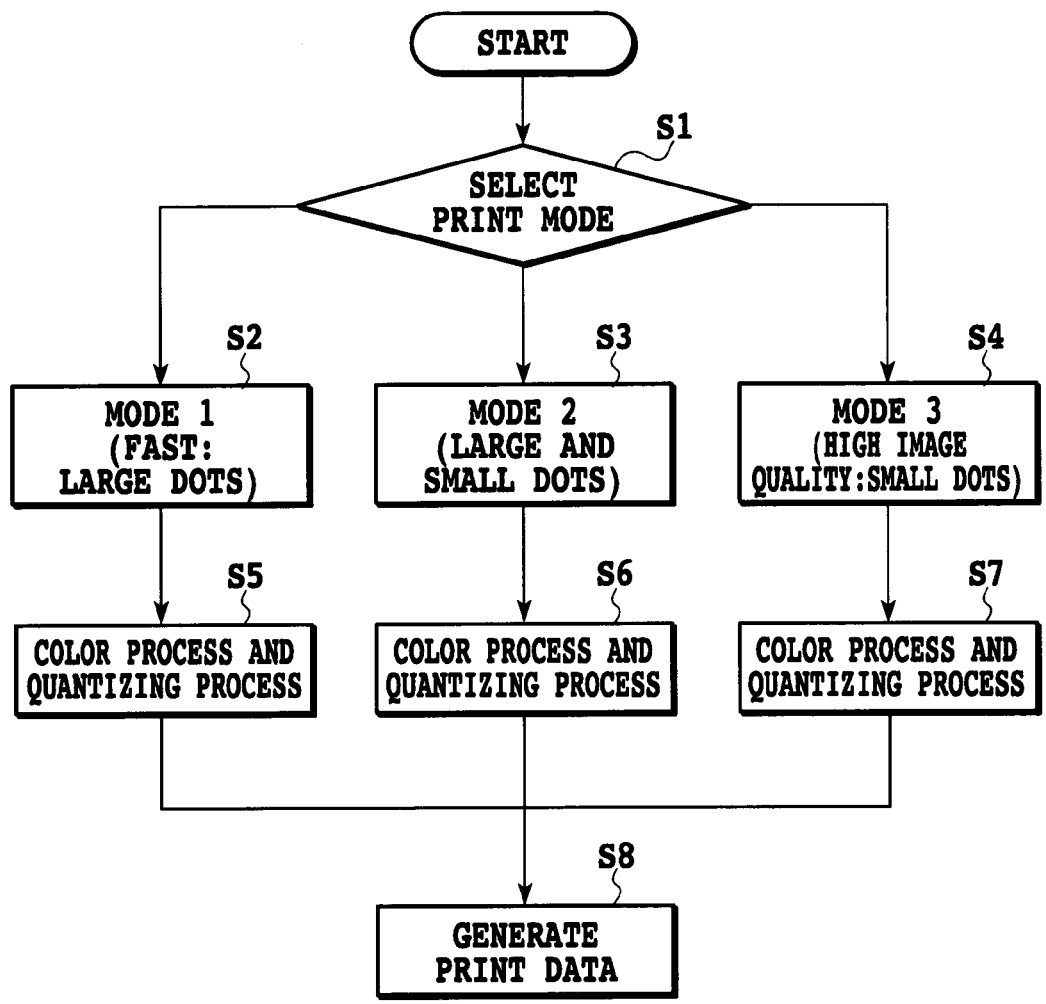
FIG. 7 is a flow chart of print data creation that is applicable to Embodiments 1 and 2 of the present invention.

FIG. 7 shows a process flow for printing according to the present embodiment. The process procedure in FIG. 7 indicates the contents of a process executed by a program executed by the CPU 102. The CPU 102 reads this program, stored in the memory 103, to execute it. First, at step 1, the CPU 102 selects a print mode in response to a user's instruction. The present embodiment uses three print modes: a mode (mode 1) that enables the fastest printing but provides a lower image quality, a mode (mode 3) that provides the most beautiful prints but operates at a lower speed, and a mode (mode 2) that accomplishes an intermediate speed and an intermediate image quality. The user can select a print mode in accordance with the purpose of the print and the desired level of image quality.

The mode 1 is set so that only large dots are used for printing in order to accomplish fast printing. The mode 2 is set so that a combination of large and small dots are used for printing in order to make the speed and image quality consistent with each other. Specifically, small dots are used for low-density parts, while large dots are used high-density parts, to accomplish efficient printing. The mode 3 is set so that only small dots are used for printing in order to provide the highest image quality.

In the mode 1, since only large dots are used, a larger print pitch (for example, 600 dpi) can be set to increase a scanning speed. On the other hand, when small dots are used, a smaller print pitch (for example, 1,200 dpi) must be set. This prevents an increase in scanning speed. Further, the number of scans executed by the head must be increased to reduce the print pitch. It will be obvious to those skilled in the art that the printing speed can be increased in the mode using only large dots and can be reduced in the mode using small dots.

In the print mode selected in step S1 and determined and set in the memory 103 in steps S2, S3, and S4, the process shown by the flow in FIG. 5 is used to carry out color processing and quantization in steps 5, 6, and 7 of a color process.

First, the mode 1 will be described. In the mode 1, only the K, C, M, and Y dots, which are larger, can be used in order to achieve fast printing. Thus, for example, to reproduce M input data so that it has the same hue as a corresponding color reproduced on the monitor, a small amount of C dots must be mixed in order to adjust the hue. However, since C output data correspond to larger dots, if a small amount of C dots are mixed into the uniform M dots, granularity occurs. Thus, in the mode 1, only the magenta ink is used for printing without ensuring that M input data has the same hue as a corresponding color reproduced on the monitor, in order to avoid granularity. That is, in the color converting process shown in FIG. 5, for M input data, a color converting process is executed using a three-dimensional LUT created so as to use only M output data for the M ink.

Description will be given of a color converting process for M input data using the three-dimensional LUT in the mode 1. The three-dimensional LUT used in the mode 1 is based on the three-dimensional LUT 601, shown in FIG. 6, has only K, C, M, and Y output data, and is created so that only M output data corresponds to M input data.

Figure 8:
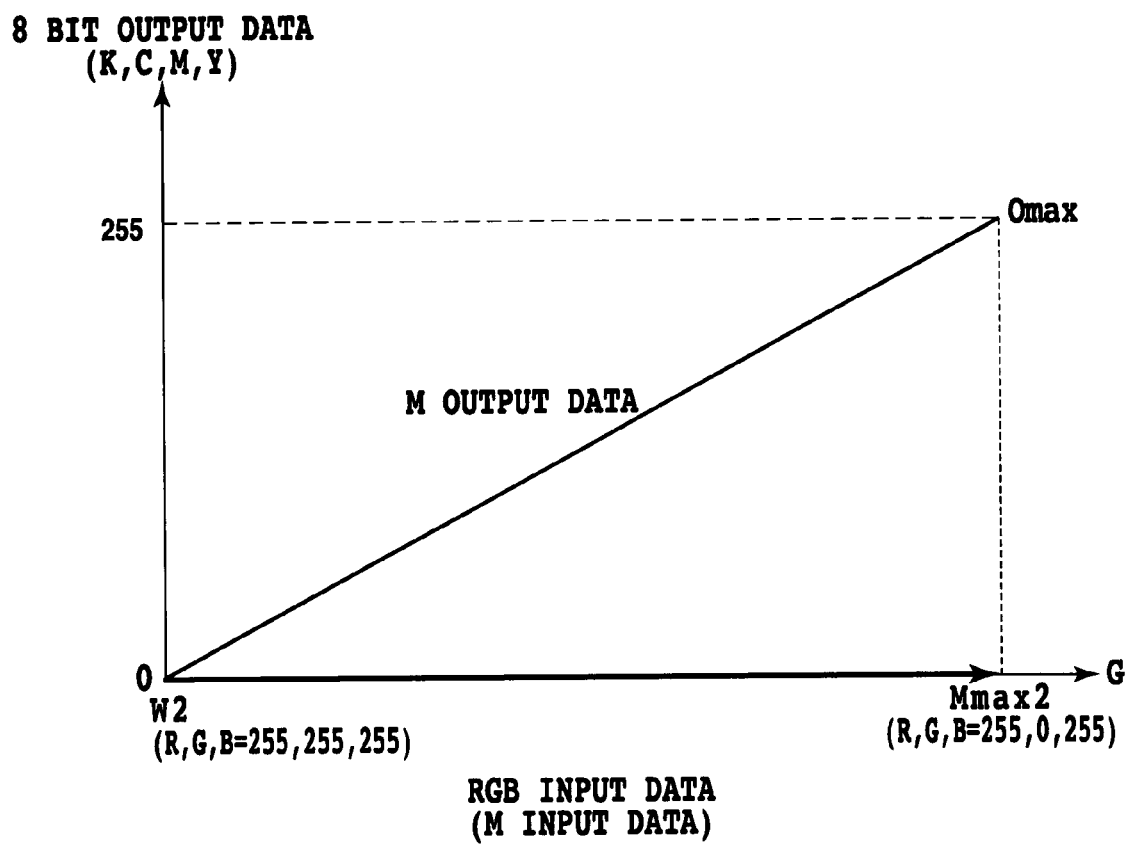
FIG. 8 is a graph showing a conversion from M input data realized by the three-dimensional LUT to 8-bit output data for respective colors, in a mode 1 according to the embodiments of the present invention.

FIG. 8 is a graph indicating a conversion from RGB input data (M input data) to 8-bit output data for the colors K, C, M, and Y, the conversion is realized using the three-dimensional LUT used in the mode 1. In FIG. 8, a point W2 corresponds to the point W1 in FIG. 6, which has RGB coordinates (255, 255, 255). A point Max2 corresponds to the point Max1 in FIG. 6, which has coordinates (255, 0, 255). In association with a change from the point W2 to the point Mmax2 in which change the coordinate for the G component decreases from 255 to 0, M output data is obtained in association with a change from the point W2 to the point Omax in which change the coordinate increases from 0 to 255.

In FIG. 8, at the point W2, M input data representative of white is converted into corresponding M output data. In this case, the M output data is zero, so that nothing is printed. Further, at the point Mmax2, M input data corresponding the densest magenta is converted into M output data at the corresponding point Omax. In this case, the M output data is 255, so that the densest magenta is printed. As seen in FIG. 8, in the color converting process for M input data, from white to the densest magenta, only the M output data for the M ink is outputted, with no K, C, and Y output data outputted.

Description has been given taking magenta by way of example. The above description can be adapted for cyan by substituting the Cmax, C input data, C output data, and the R component for the Mmax, M input data, M output data, and G component, respectively. Alternatively, the above description can be adapted for yellow by substituting the Ymax, Y input data, Y output data, and the B component for the Mmax, M input data, M output data, and G component, respectively.

Now, the mode 2 will be described. K, C, M, Y, sc, sm, and sy dots are used in the mode 2: both large and small dots are used in this mode. In this mode, for example, to convert M input data so that its printed color has the same hue as a corresponding color reproduced on the monitor, sc dots, which are smaller, are used to adjust the hue. Small dots have lower granularity than large dots. Accordingly, image quality is not degraded even if a small amount of sc dots are mixed into uniform M dots. It is thus possible to make the hue of a printed color based on the M input data closer to that of a corresponding monitor displayed color. Specifically, in the color converting process shown in FIG. 5, for example, for M input data, a three-dimensional LUT is used which causes the output of not only significant data (M output data) for the M ink but also significant data (sc output data) for the sc ink.

Description will be given of a color converting process for M input data using the three-dimensional LUT in the mode 2. The three-dimensional LUT used in the mode 2 is based on the three-dimensional LUT 601, shown in FIG. 6, has K, C, M, Y, sc, sm, and sy output data, and is created so that not only M output data but also sc output data correspond to M input data.

Figure 9:
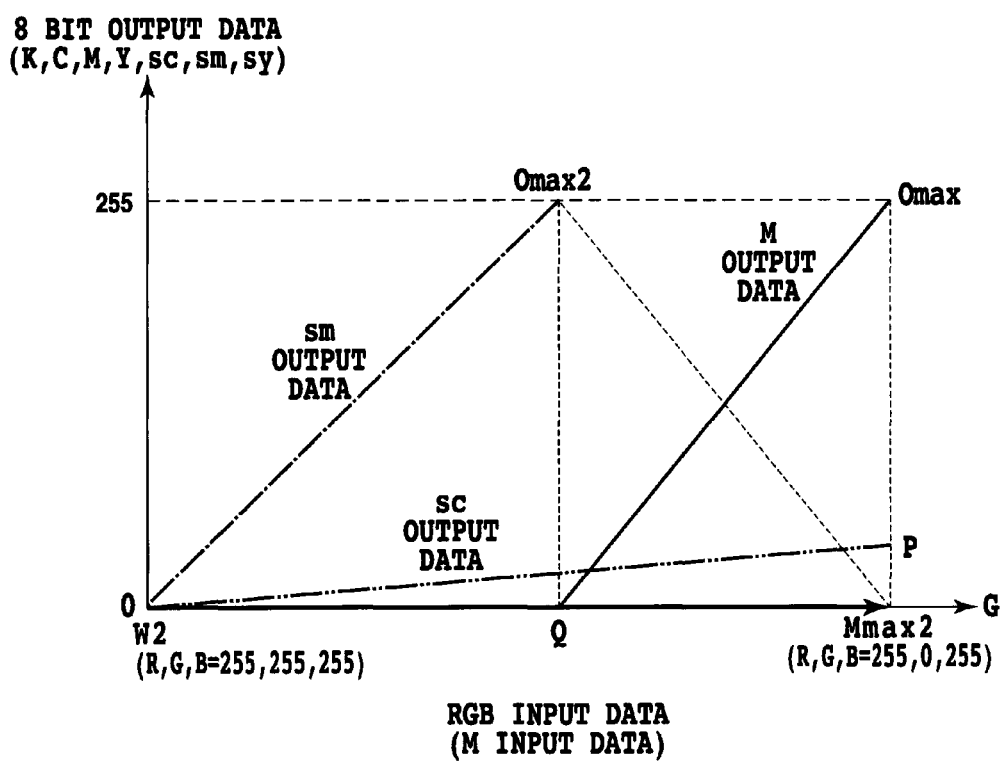
FIG. 9 is a graph showing a conversion from M input data realized by the three-dimensional LUT to 8-bit output data for respective colors, in a mode 2 according to the embodiments of the present invention.

FIG. 9 is a graph indicating a conversion from RGB input data (M input data) to 8-bit output data for the colors K, C, M, Y, sc, sm, and sy, the conversion is realized using the three-dimensional LUT used in the mode 2. In FIG. 9, the point W2 corresponds to the point W1 in FIG. 6, which has RGB coordinates (255, 255, 255). The point Max2 corresponds to the point Max1 in FIG. 6, which has coordinates (255, 0, 255).

In association with a change from the point W2 to the point Q in which change the coordinate for the G component decreases from 255 to n (n is arbitrarily set), sm output data (shown by an alternate long and short dash line) and sc output data (shown by an alternate long and two short dashes line) for a small amount of sc ink are obtained, the sm output data corresponding to a change from the point W2 to the point Omax2 in which change the coordinate increases from 0 to 255. M input data corresponding to a denser magenta is converted in association with a change from a point Q to the point Mmax2 in which change the coordinate for the G component decreases from n to 0. Thus, M output data, sm output data, and sc output data for a small amount of sc ink are obtained, the M output data corresponding to a change from the point Q to the point Omax in which change the coordinate increases from 0 to 255, the sm output data corresponding to a change from the point Omax2 to the point Mmax2 in which change the coordinate decreases from 255 to 0.

In FIG. 9, at the point W2, M input data representative of white is converted into corresponding M output data. In this case, the M output data is zero, so that nothing is printed. Further, at the point Mmax2, M input data corresponding the densest magenta is converted into M output data at the corresponding point Omax. In this case, the M output data is 255, so that the densest magenta is printed. As seen in FIG. 9, in the color converting process for M input data, from white to the densest magenta, the M output data for the M ink, the sm output data for the sm ink, and the sc output data for a small amount of sc ink are outputted, with no K, C, Y, or sy output data outputted.

Description has been given taking magenta by way of example. The above description can be adapted for cyan by substituting the Cmax, C input data, C output data, and the R component for the Mmax, M input data, M output data, and G component, respectively, and substituting sc output data and sy output data for the sm output data and sc output data, respectively. Alternatively, the above description can be adapted for yellow by substituting the Ymax, Y input data, Y output data, the B component, and sy output data for the Mmax, M input data, M output data, G component, and sm output data, respectively.

Now, the mode 3 will be described. The mode 3 uses only K dots and small dots (sc, sm, and sy) and requires the highest image quality in the present embodiment. In this case, for example, by executing a color converting process using a three-dimensional LUT such that sm output data and sc output data are provided for M input data, conversion can be carried out in which sm dots and sc dots are mixed so that a printed color matches a corresponding monitor displayed color.

Description will be given of a color converting process for M input data using the three-dimensional LUT in the mode 3. The three-dimensional LUT used in the mode 3 is based on the three-dimensional LUT 601, shown in FIG. 6, has only K, sc, sm, and sy output data, and is created so that not only sm output data but also sc output data correspond to M input data.

Figure 10:
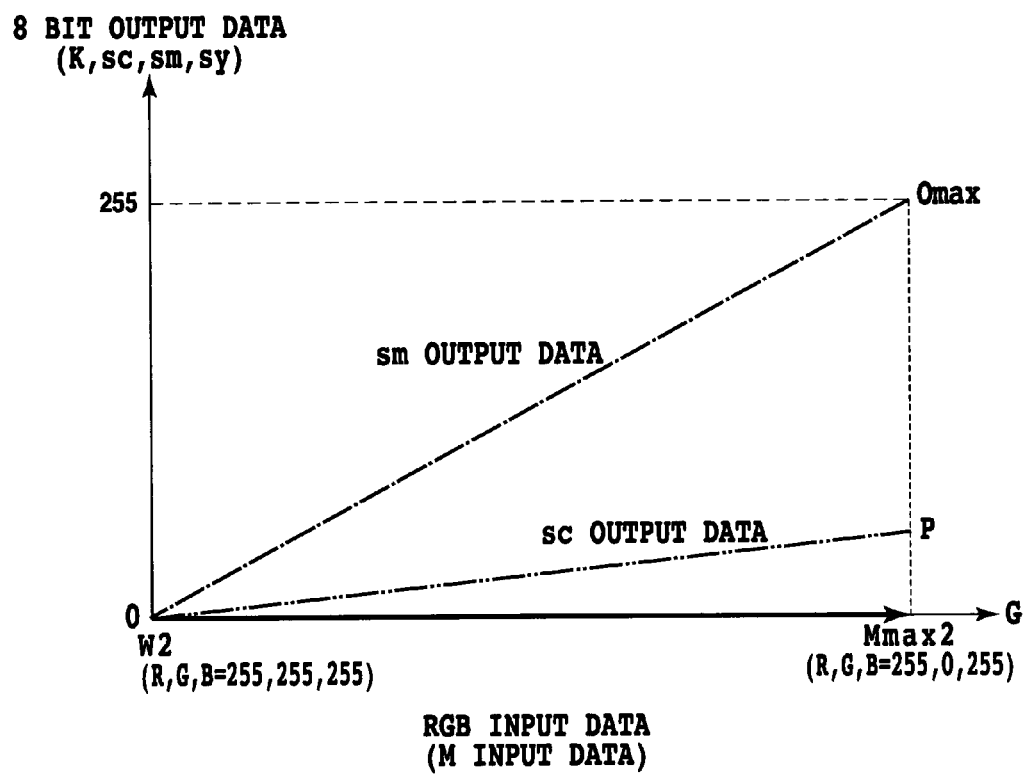
FIG. 10 is a graph showing a conversion from M input data realized by the three-dimensional LUT to 8-bit output data for respective colors, in a mode 3 according to the embodiments of the present invention.

FIG. 10 is a graph indicating a conversion from RGB input data (M input data) to 8-bit output data for the colors K, sc, sm, and sy, the conversion is realized using the three-dimensional LUT used in the mode 3. In FIG. 10, the point W2 corresponds to the point W1 in FIG. 6, which has RGB coordinates (255, 255, 255). The point Mmax2 corresponds to the point Mmax1 in FIG. 6, which has coordinates (255, 0, 255).

In association with a change from the point W2 to the point Mmax2 in which change the coordinate for the G component decreases from 255 to 0, sm output data (shown by an alternate long and short dash line) and sc output data (shown by an alternate long and two short dashes line) for a small amount of sc ink are obtained, the sm output data corresponding to a change from the point W2 to the point Omax in which change the coordinate increases from 0 to 255.

In FIG. 10, at the point W2, M input data representative of white is converted into corresponding M output data. In this case, the M output data is zero, so that nothing is printed. Further, at the point Mmax2, M input data corresponding the densest magenta is converted into M output data at the corresponding point Omax. In this case, the M output data is 255, so that the densest magenta is printed. As seen in FIG. 10, in the color converting process for M input data, from white to the densest magenta, the sm output data for the sm ink and the sc output data for a small amount of sc ink are outputted, with no K or sy output data outputted.

Description has been given taking magenta by way of example. The above description can be adapted for cyan by substituting the Cmax, C input data, C output data, and the R component for the Mmax, M input data, M output data, and G component, respectively, and substituting sc output data and sy output data for the sm output data and sc output data, respectively. Alternatively, the above description can be adapted for yellow by substituting the Ymax, Y input data, Y output data, the B component, and sy output data for the Mmax, M input data, M output data, G component, and sm output data, respectively.

In the above description, the target to which a hue is to be changed is the corresponding hue on the monitor. However, in this case, the matching between prints and the monitor is focused on. The present invention is not limited to this aspect. The hue may be changed to one more preferable for prints.

Further, in the present embodiment, the C, M, and Y inks are used as essential inks and the hues of the colors C, M, and Y have been described. However, the present embodiment is also effective if a special color ink of red, green, or the like is used in addition to the C, M, and Y inks in order to provide a higher image quality. For example, if a red ink has a hue closer to yellow than to a desired one, then with an ink system that can use small magenta dots, the desired red color can be reproduced without enhancing granularity by mixing small magenta dots into red dots. However, with an ink system that cannot use small magenta dots, only the original red ink is used for the hue of a printed color specified as red in an input signal.

In step S8, print data is generated from image data subjected to the process in the above steps S5, S6, and S7 and is then transmitted to the printer.

As described above, with a large-and-small-dot ink system, if a mode uses small dots, the hues of the essential primary colors C, M, and Y can be made closer to those intended by a designer, e.g. the hues displayed on the monitor, while avoiding granularity that may degrade image quality. On the other hand, in a mode that does not use small dots, the hues of the essential primary colors C, M, and Y are reproduced using only the corresponding ink colors in order to avoid granularity. Thus, regardless of the print mode, high-quality print results are obtained while avoiding granularity that may degrade image quality. In this case, reproducing the hues of the essential primary colors C, M, and Y using only the corresponding ink colors means that, in a color converting process, printed colors from C, M, and Y input data are not matched to monitor displayed colors from the C, M, and Y input data. Specifically, for example, if image data composed of 8 bits for each of the colors R, G, and B is inputted, then for a color (Y input data) having the largest R and G values and the smallest B value, only the Y ink is used which does not match the hue of the Y input data. On the other hand, if printed colors are matched to corresponding monitor displayed colors, then for example, for a color (Y input data) having the largest R and G values and the smallest B value, the Y ink and a small amount of C ink are used in order to match with the hue of the Y input data.

Embodiment 2

Basically, the description given with reference to FIGS. 2 to 10, described above, is also applied to Embodiment 2. In Embodiment 1, the two modes are used. In one of the modes, dots of two ink colors are mixed to obtain a printed color in an input signal for the essential primary colors C, M, and Y. In the other mode, dots of two ink colors are not mixed for this purpose. However, some colors may appear markedly granular depending on their tints. For example, C dots appear differently whether they are mixed into M dots or Y dots, owing to the difference between the difference in brightness between the C ink and M ink and the difference in brightness between the C ink and Y ink. Also with a system using large and small dots, if small dots are not sufficiently small, the granularity may not be marked even when sc dots are mixed into M dots, but may be marked when sc dots are mixed into Y dots. For example, in this case, in Embodiment 2, Y input data is not mixed with sc dots having a predetermined difference in brightness from this data but is reproduced using the color of the Y ink. Then, sc dots are mixed only into M input data to adjust the hue. Thus, the colors are optimally mixed by adjusting granularity and tints.

It will be obvious to those skilled in the art that the process according to Embodiment 2 may be accomplished by adapting steps S3 to S6 and S4 to S7 in FIG. 7 for the above description.

Embodiment 3

Basically, the description given with reference to FIGS. 2 and 4, described above, is also applied to Embodiment 3. In Embodiments 1 and 2, description has been given of the example of the large-and-small-dot ink system using two types of dots having the same color but different sizes. In Embodiment 3, description will be given of a dark-and-light-color-dot ink system using two types of inks having the same shade but different densities.

In the present embodiment, the following six inks are used: black (K), dark cyan (C), dark magenta (M), dark yellow (Y), light cyan (LC), and light magenta (LM). It will be easy for those skilled in the art to provide an ink jet print head for this case by adapting the print head described with reference to FIG. 2 for the present embodiment so that an LC and LM ink tanks are added in FIG. 2 and that an LC and LM ink ejecting heads are substituted for the heads 11sc, 11sm, and 11sy in FIG. 3.

Figure 11:
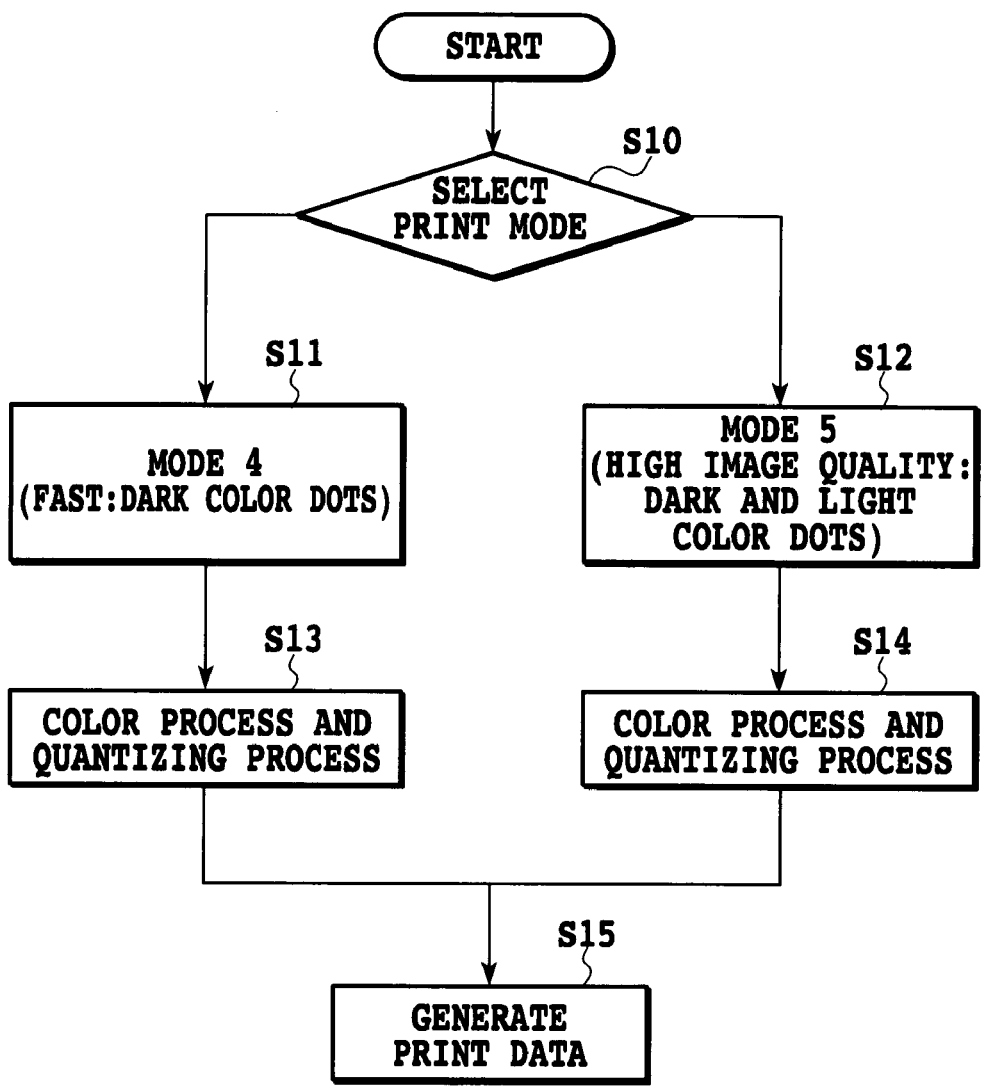
FIG. 11 is a flow chart of print data creation that is applicable to Embodiment 3 of the present invention.

FIG. 11 shows a printing process flow according to the present embodiment. The process procedure in FIG. 11 shows the contents of a process executed by a program executed by the CPU 102. The CPU 102 reads this program, stored in the memory 103, to execute it. First, in step S10, the CPU 102 selects a print mode in response to the user's instruction. In the present embodiment, the following two modes are used: a mode (mode 4) that enables fast printing but provides a lower image quality and a mode (mode 5) that provides beautiful prints but operates at a lower speed. The user can select one of the print modes in accordance with the purpose of the print or the desired level of image quality.

The mode 4 is set so that a printing operation is achieved using only K and dark C, M, and Y dots. The use of only four colors for printing reduces the amount of data required and the number of printing passes, while increasing a printing speed. However, it is desirable to avoid granularity in areas with low densities. The mode 5 uses all the inks including the light color inks to reduce granularity, while providing high-quality print results.

In the mode selected in step S10, determined in steps S11 and S12, and set in the memory 103, in color processing steps S13 and S14, color processing and quantization are carried out using the process shown by the flow in FIG. 5. It will be appreciated by those skilled in the art that this process corresponds to the process flow in FIG. 5, in which sc, sm, and sy are replaced with LC and LM. Color converting process parameters are specific to each mode.

First, the mode 4 will be described. Only the dark color dots K, C, M, and Y can be used in the mode 4. Thus, for example, to reproduce a printed color from M input data so that its hue is the same as that of a corresponding color reproduced on the monitor, there is no other way but to mix a small amount of C dots into M dots in order to adjust the hue. However, since the C dots have a dark color, granularity may occur when a small amount of C dots are mixed into uniform M dots. Thus, in the mode 4, to avoid the granularity, a printing operation is achieved using only the ink color of M dots without making the hue of essential M input data closer to that of a corresponding color on the monitor. That is, in the color converting process shown in FIG. 5, a three-dimensional LUT is used which is created so as to deal with only M output data for the M ink.

The color converting process for M input data using the three-dimensional LUT in the mode 4 is the same as the above color converting process for M input data using the three-dimensional LUT in the mode 1.

Then, the mode 5 will be described. K, C, M, Y, LC, and LM dots, i.e. both dark and light color dots can be used in the mode 5. In this mode, for example, to reproduce M input data so that its hue is the same as that of a corresponding color reproduced on the monitor, LC dots, which are light color dots, can be used to adjust the hue. Since light color dots provide lower granularity than dark color dots, image quality is not degraded even when a small amount of LC dots are mixed into uniform M dots. Thus, the hue of the M input data can be made closer to that of magenta on the monitor. Specifically, in the color converting process shown in FIG. 5, for M input data, a three-dimensional LUT is used which causes the output of not only significant data (M output data) for the M ink but also significant data (LC output data) for the LC ink.

Description will be given of a color converting process for M input data using the three-dimensional LUT in the mode 3. The three-dimensional LUT used in the mode 5 is based on the three-dimensional LUT 601, shown in FIG. 6, has K, C, M, Y, LC, and LM output data, and is created so that not only M output data but also LC output data correspond to M input data.

Figure 12:
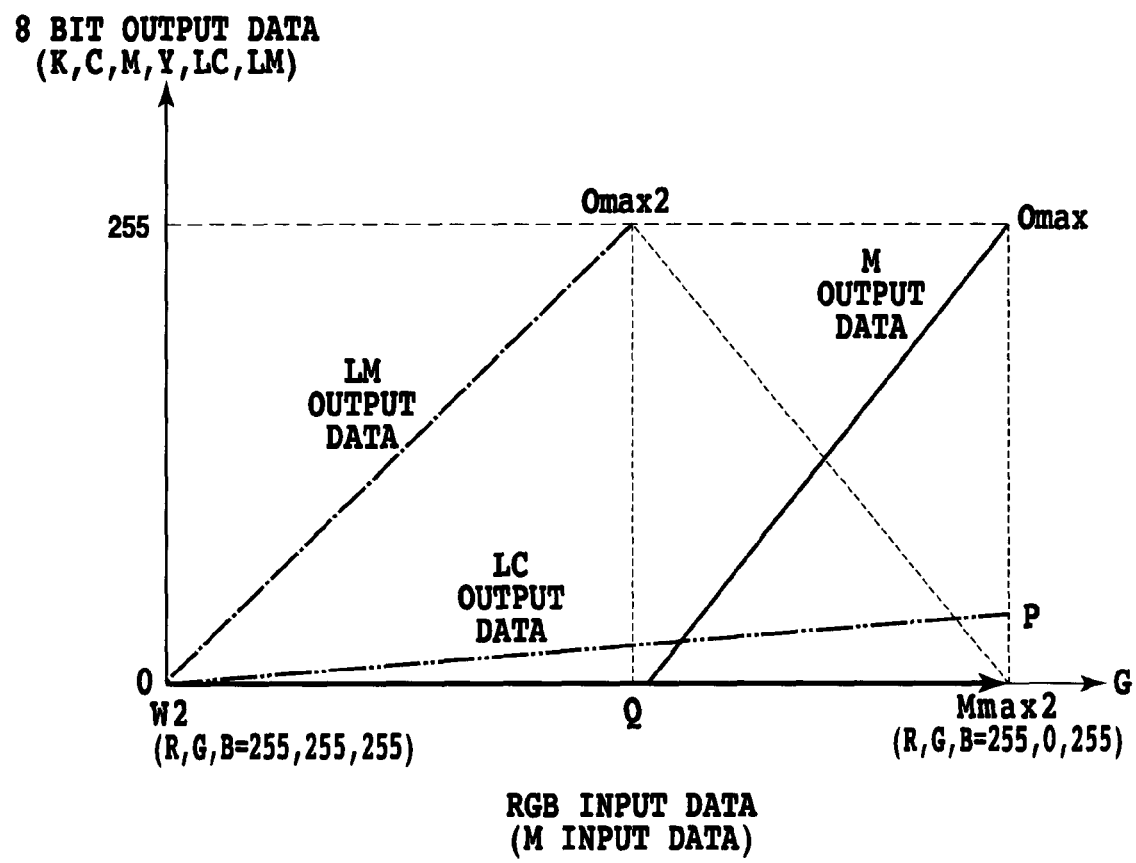
FIG. 12 is a graph showing a conversion from M input data realized by the three-dimensional LUT to 8-bit output data for respective colors, in a mode 5 according to the embodiments of the present invention.

FIG. 12 is a graph indicating a conversion from RGB input data (M input data) to 8-bit output data for the colors K, C, M, Y, LC, and LM, the conversion is realized using the three-dimensional LUT used in the mode 5. In FIG. 12, the point W2 corresponds to the point W1 in FIG. 6, which has RGB coordinates (255, 255, 255). The point Mmax2 corresponds to the point Mmax1 in FIG. 6, which has coordinates (255, 0, 255).

In association with a change from the point W2 to the point Q in which change the coordinate for the G component decreases from 255 to n (n is arbitrarily set), LM output data (shown by an alternate long and short dash line) and LC output data (shown by an alternate long and two short dashes line) for a small amount of LC ink are obtained, the LM output data corresponding to a change from the point W2 to the point Omax2 in which change the coordinate increases from 0 to 255. M input data corresponding to a denser magenta is converted in association with a change from the point Q to the point Mmax2 in which change the coordinate for the G component decreases from n to 0. Thus, M output data, LM output data, and LC output data for a small amount of LC ink are obtained, the M output data corresponding to a change from the point Q to the point Omax in which change the coordinate increases from 0 to 255, the LM output data corresponding to a change from the point Omax2 to the point Mmax2 in which change the coordinate decreases from 255 to 0.

In FIG. 12, at the point W2, M input data representative of white is converted into corresponding M output data. In this case, the M output data is zero, so that nothing is printed. Further, at the point Mmax2, M input data corresponding the densest magenta is converted into M output data at the corresponding point Omax. In this case, the M output data is 255, so that the densest magenta is printed. As seen in FIG. 12, in the color converting process for M input data, from white to the densest magenta, the M output data for the M ink, the LM output data for the LM output data, and the LC output data for a small amount of LC ink are outputted, with no K, C, or Y output data outputted.

Description has been given taking magenta by way of example. The above description can be adapted for cyan by substituting the Cmax for the Mmax, omitting the LC output data, and substituting C input data, C output data, the R component, and LC output data for the M input data, M output data, G component, and LM output data, respectively. Alternatively, the above description can be adapted for yellow by substituting the Ymax for the Mmax, omitting the LM output data, making M output data change from the point W2 to the point Omax, and substituting Y input data, Y output data, and the B component for M input data, M output data, and G component, respectively.

The above description takes magenta by way of example but is also applicable to cyan and yellow. Further, in the above description, the target to which a hue is to be changed is the corresponding hue on the monitor. However, in this case, the matching between prints and the monitor is focused on. The present invention is not limited to this aspect. The hue may be changed to one more preferable for prints.

In step S15, print data is generated from image data subjected to the processing in steps S13 and S14 and is transmitted to the printer.

As described above, with a dark-and-light-color-dot ink system, in a mode that uses light color dots, the hues of the essential primary colors C, M, and Y can be made closer to those intended by a designer, e.g. the hues displayed on the monitor, while avoiding granularity that may degrade image quality. On the other hand, in a mode that does not use light color dots, the hues of the essential primary colors C, M, and Y are reproduced using only the corresponding ink colors in order to avoid granularity. Thus, regardless of the print mode, high-quality print results are obtained while avoiding granularity that may degrade image quality.

Other Embodiments

It goes without saying that the present invention may be achieved by supplying a system or an apparatus with a storage medium in which the program code of software that realizes the functions of Embodiments 1 to 3, described above, are recorded, and causing a computer (or CPU or MPU) of the system or apparatus to read out and execute the program code stored in the storage medium.

In this case, the program code itself read out from the storage medium realizes the novel functions of the present invention, so that the storage medium storing the program code also constitutes the present invention.

The storage medium for supplying the program code may be selected from, for example, a Floppy® disk, hard disk, magneto-optical disk, optical disk, CD-ROM, CD-R, magnetic tape, non-volatile memory card, and ROM.

The functions of the above described embodiments may be accomplished not only by executing a program code read out by a computer, but also by causing an operating system (OS) that operates on the computer to perform a part of the whole of the actual operations according to instructions of the program code.

Furthermore, the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiments.

It should be appreciated that the present invention is applicable if the program from the recording medium in which the program code of the software realizing the embodiments is distributed to a requester via a communication line, for example, one connecting personal computers together.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image processing apparatus comprising:
   a first unit for converting primary color data into color data for outputting a dark color material only in a first mode, wherein the primary color has any two of maximum values and one of minimum value of colors R, G and B; and
   a second unit for converting the primary color data having any two of maximum values and one of minimum values of colors R, G and B into color data for outputting both the dark color material and a light color material in a second mode, wherein
   the color data converted from the primary color data in the second mode is color data for outputting both the dark color material corresponding to a complementary color of the minimum value of colors and light material other than the complementary color of the minimum value of colors.

2. The image processing apparatus of claim 1, wherein the first mode is a fast printing mode and the second mode is a mode in which image quality is higher than that in the first mode.

3. The image processing apparatus of claim 1, wherein the first mode is a mode for lowering granularity and the second mode is a mode for color matching.

4. The image processing apparatus of claim 1, wherein the dark color materials are K, C, M and Y inks.

5. The image processing apparatus of claim 1, wherein the light color materials are light cyan and light magenta inks.

6. An image processing apparatus for forming an image by using dark color materials and light color materials, the apparatus comprising:
   a first unit for forming an image by using just the dark color material for reproducing primary color data in a first mode, wherein
   the primary color has any two of maximum values and one of minimum value of colors R, G and B; and
   a second unit for forming an image by using the dark color material and a light color material having a different color from the dark color material for reproducing the primary color data having any two of maximum values and one of minimum values of colors R, G and B in a second mode, wherein
   the image formed in the second mode is formed by using both the dark color material corresponding to a complementary color of the minimum value of colors and light material other than the complementary color of the minimum value of colors.

7. The image processing apparatus of claim 1, wherein the primary color data is a color data in which two of colors R, G, and B have their maximum values, and wherein the dark color material and the light color material are mixed in the second mode.

8. The image processing apparatus of claim 6, wherein the primary color data is a color data in which two of colors R, G, and B have their maximum values, and wherein the dark color material and the light color material are mixed in the second mode.

9. The image processing apparatus of claim 6, wherein the first mode is a mode for lowering granularity and the second mode is a mode for color matching.

10. An image processing method comprising the steps of:
    converting primary color data into color data for outputting a dark color material only in a first mode, wherein the primary color has any two of maximum values and one of minimum value of colors R, G and B; and
    converting the primary color data having any two of maximum values and one of minimum values of colors R, G and B into color data for outputting both the dark color material and a light color material in a second mode,
    with both said steps being performed on a computer, wherein
    the color data converted from the primary color data in the second mode is color data for outputting both the dark color material corresponding to a complementary color of the minimum value of colors and light material other than the complementary color of the minimum value of colors.

11. The image processing method of claim 10, wherein the first mode is a fast printing mode and the second mode is a mode in which image quality is higher than that in the first mode.

12. The image processing method of claim 10, wherein the first mode is a mode for lowering granularity and the second mode is a mode for color matching.

13. The image processing method of claim 10, wherein the dark color materials are K, C, M and Y inks.

14. The image processing method of claim 10, wherein the light color materials are light cyan and light magenta inks.

15. An image processing method of forming an image by using dark color materials and light color materials, the method comprising the steps of:
    forming an image by using just the dark color material for reproducing primary color data in a first mode, wherein the primary color has any two of maximum values and one of minimum value of colors R, G and B; and
    forming an image by using the dark color material and a light color material having a different color from the dark color material for reproducing the primary color data having any two of maximum values and one of minimum values of colors R, G and B in a second mode,
    with both said steps being performed on a computer, wherein
    the image formed in the second mode is formed by using both the dark color material corresponding to a complementary color of the minimum value of colors and light material other than the complementary color of the minimum value of colors.

16. The image processing method of claim 10, wherein the primary color data is a color data in which two of colors R, G, and B have their maximum values, and wherein the dark color material and the light color material are mixed in the second mode.

17. The image processing method of claim 15, wherein the primary color data is a color data in which two of colors R, G, and B have their maximum values, and wherein the dark color material and the light color material are mixed in the second mode.

18. The image processing method of claim 15, wherein the first mode is a mode for lowering granularity and the second mode is a mode for color matching.

19. A non-transitory computer-readable recording medium encoded with computer-executable instructions for performing an image processing method, the method comprising the steps of:

converting primary color data into color data for outputting a dark color material only in a first mode, wherein the primary color has any two of maximum values and one of minimum value of colors R, G and B; and converting the primary color data having any two of maximum values and one of minimum values of colors R, G and B into color data for outputting both the dark color material and a light color material in a second mode, wherein the color data converted from the primary color data in the second mode is color data for outputting both the dark color material corresponding to a complementary color of the minimum value of colors and light material other than the complementary color of the minimum value of colors.

20. A non-transitory computer-readable recording medium encoded with computer-executable instructions for performing an image processing method of forming an image by using dark color materials and light color materials, the method comprising the steps of:

forming an image by using just the dark color material for reproducing primary color data in a first mode, wherein the primary color has any two of maximum values and one of minimum value of colors R, G and B; and forming an image by using the dark color material and a light color material having a different color from the dark color material for reproducing the primary color data having any two of maximum values and one of minimum values of colors R, G and B in a second mode, wherein the image formed in the second mode is formed by using both the dark color material corresponding to a complementary color of the minimum value of colors and light material other than the complementary color of the minimum value of colors.

* * * * *